Patented Mar. 10, 1942

2,275,659

UNITED STATES PATENT OFFICE 2,275,659

WATER REMOVABLE WAX COATING

John Vernon Steinle and Anton E. Budner, Racine, Wis., assignors to S. C. Johnson & Son, Inc., Racine, Wis., a corporation of Wisconsin No Drawing. Application February 25, 1939, Serial No. 258,569

10 Claims. (Cl. 99—168)

This invention relates to protective coatings, and more particularly to a liquid coating having dispersed therein finely divided particles of a nature such that, after the drying of the coating upon the skin or peel of a fruit or vegetable, the particles will swell during a water washing operation and thereby will assist in removing the coating by causing it to disintegrate and loosen itself from the skin or peel.

By way of approach, a description of the coatings used by citrus fruit processors is desirable, because it is the adaptation of these coatings to fruits and vegetables having edible peels that has resulted in the problem here solved. For several years the citrus fruit processors have applied to oranges and lemons a coating of paraffin or wax which prolongs the life of the fruit and greatly improves its appearance. During the early period of coating these fruits, the ingredients of the coatings were the low melting point waxes and paraffins or combinations of the two without other ingredients—excepting sometimes a fungicide. The simplicity of these coatings was attributable largely to the method of applying the coating, which consisted in brushes scraping particles of wax or paraffin from solid cakes of these substances and rubbing the particles onto the fruit.

More recently, these processors came to appreciate the higher luster value, the superior hardness, the more lasting quality and the greater ability to form very thin coatings, of the high melting point waxes, such as carnauba and candelilla. These waxes are difficult to apply by the brushing process because of the hardness of the waxes cakes, but the manufacturers of floor wax had introduced to the market in 1929 an aqueous, carnauba wax suspension stable at ordinary temperatures, which they in turn had borrowed from the leather finishing art. These are generally referred to as the "no rubbing" floor waxes. The fruit processors experimented with these water waxes and found that by a mere dipping process at room temperatures, a thin, highly lustrous, durable, air impervious coating could be applied to the fruit.

These water wax coatings, after drying, however, are not composed merely of wax. In order to suspend the high melting point waxes in water, the floor wax manufacturers resorted to the then little known ethanolamine soaps, which reduce the interfacial tension between the water and wax, leaving the wax in a colloidal suspension owing its stability to an electric charge on the particle. These ingredients in varying amounts remain in the dry coating after it has been applied to the floor and after the water of the coating has evaporated. This type of coating was adopted outright by the citrus fruit processors. Today, one may detect by feel and appearance these coatings on most California citrus products, and if one ate the whole of one of these oranges, including the skin, he would take into his stomach the above named ingredients.

Because of the commercial success of coating citrus fruit, experimentation with these liquid coatings upon vegetables and fruits having edible peels has been proceeding. And as one would expect, the salable life of a wax coated carrot is several times as long as that of the uncoated carrot. But the coating must now meet a new test. When an orange is eaten, the skin or peel has been removed, and the wax coating has been discarded with it. But in the case of vegetables or fruit having edible peels, while they may occasionally be scraped a bit, generally they are merely washed—sometimes cooked; and served. The wax, being insoluble in water, and some shellac, soap, borax, oleic acid and triethanolamine, all within the wax film, are not removed by washing, or wholly removed by cooking, and consequently reach the table and are eaten. While none of these substances are known to have toxic effects (although recently triethanolamine has been charged with slight toxicity), nevertheless, they detract from the taste of the food and several, particularly wax and paraffin, are very indigestible. The stomach of the average person will pass, as contrasted with digest, these ingredients, but many people cannot handle them internally, as for example those who are obliged to peel an apple because their stomachs will not handle the wax coating which nature puts on the peel. Moreover, as the coating of foods becomes more general, increasing quantities of indigestible waxes, paraffins and other substances will be taken into the human system. The stomach will have to pass much material which should never have been taken into it.

It can scarcely be controverted that if the coating of vegetables and fruit having edible peels is to be a commercial success, the coating must be removed before eating. And it is no answer from a commercial standpoint that the coating can be removed by scrubbing. A scrub brush and warm to hot water will remove most of the wax from the surface (not from the pores) of the vegetable or fruit, but the habits of housewives are not to be changed in an age tending toward the simplification of kitchen processing of foods rather than the complication thereof. If the process is to come into general use, the wax coating must be readily removed by an operation already in use for the treating of vegetables and fruits having edible peels—simple washing.

The object of this invention is to take advantage of the fact that vegetables and fruits having edible peels are washed in the kitchen before serving, and to do this by providing a protective coating which, upon contacting a volume of water, will swell and loosen itself from skin or peel.

Our original approach to the problem was to consider alteration of the water wax formulae by increasing the proportions of water soluble ingredients so that when the hardened coating on the fruit recontacted water, the very soluble elements would loosen themselves from the wax and weaken and break the wax film. The difficulty with this approach is that each water wax suspension has a formula which fits it for a particular surface and consequently may not be altered without impairing its effectiveness. In short, one cannot increase the solubilizing character of the formula and retain its stability.

The second approach, which constitutes the gist of this invention, turns on the conception of inserting into the wax coating a water actuated substance which when the vegetable or fruit is washed, swells with such force as to break the wax film and loosen it from the skin or peel.

Attention is called to the fact that the water actuated substance must have a reversible quality because the hardened film on the fruit or vegetable was applied in a water liquid state and permitted to dry. In more detail, the water actuated substance was first permitted to act when mixed into the water wax coating. Upon the drying of the coating upon the fruit or vegetable, the water actuated substance must return to its original state and ready to be again actuated by water. A substance which will so perform may be described as a resoluble or reversible lyocratic colloid in water. The substance may be organic or inorganic. It must have a liking for water, or expressed differently, the ability to imbibe water. In the colloid that is formed, the stronger the bond between the two phases, the more effective the colloid for this purpose. For in order to loosen the wax film from a skin or peel, the colloid must have sufficient strength to swell and shatter the wax film, thereby loosening it from the peel. This strength is derived from the affinity of the two substances. A lyocratic colloid is one which owes its stability to the water of hydration or a liquid layer surrounding the particle. This layer is referred to as a water hull or solvetized layer.

With these introductory remarks, we will proceed to four coatings.

Formula I

A simple liquid coating which demonstrates the principle of operation of our invention is the following:

| | | |
|---|---|---|
| Wax | gm | 30 |
| Soap | gm | 6.5 |
| Water | gm | 260 |
| Bentonite | gm | 0.30 to 2.6 |

(The bentonite range is critical. The amounts of the other ingredients are not critical.)

This coating is prepared by introducing the bentonite to the water and permitting the former to swell. Upon completion of the swelling process, the bentonite solution is heated and then stirred into a 220 degree Fahrenheit thoroughly mixed wax base comprising the wax and soap.

Formula II

The following is a preferred self-lustering coating:

| | | |
|---|---|---|
| Carnauba wax | gm | 30 |
| Oleic acid | gm | 3.3 |
| Caustic soda | gm | 0.5 |
| Triethanolamine | gm | 2.7 |
| Shellac solution | cc | 60 |
| Water | gm | 260 |
| Bentonite (KWK-Volclay of American Colloid Company) | gm | 0.30 to 2.6 |

The shellac solution is prepared as follows:

| | | |
|---|---|---|
| Refined wax free shellac | lbs | 1.5 |
| Borax | lb | 0.33 |
| Water | gal | 1.0 |

This coating is prepared by adding a twenty per cent caustic soda in water solution to the molten wax and oleic acid heated to about 220 degrees Fahrenheit, adding the triethanolamine, and heating the resulting mixture for about twenty minutes. The bentonite is placed in the water and allowed to swell. When the swelling has been completed, the bentonite water solution is brought to a boil and slowly stirred into the wax base. The emulsion thus prepared is cooled rapidly and the shellac solution added.

Formula III

A third self-lustering coating utilizes a swelling material which lies in the organic class, gelatin. This formula is identical to the second with the exception that the maximum amount of the gelatin that may be used is about one-half the amount of the bentonite used, and with the further exception that the usual preservative agent must be used to stop any bacteria growth that might occur in the gelatin.

| | | |
|---|---|---|
| Carnauba wax | gm | 30 |
| Oleic acid | gm | 3.3 |
| Caustic soda | gm | 0.5 |
| Triethanolamine | gm | 2.7 |
| Shellac solution | cc | 60 |
| Water | gm | 260 |
| Gelatin | gm | 0.3 to 1.3 |

(The ranges of all ingredients excepting the gelatin are not critical.)

The shellac solution is identical with that in Formula II and the mixing processes there set forth may be followed.

Formula IV

A second preferred self-lustering formula is the following:

| | | |
|---|---|---|
| Carnauba wax | gm | 30 |
| Oleic acid | gm | 3.3 |
| Caustic soda | gm | 0.5 |
| Triethanolamine | gm | 2.7 |
| Shellac solution | cc | 60 |
| Water | gm | 260 |
| Irish moss bleached | gm | 0.2 to 0.65 |

The weight of the Irish moss used is based on the solids remaining after the moss solution is carefully strained.

Method of application to fruits and vegetables

Generally, the dip process is used in applying our coatings. Being stable suspensions at ordinary temperatures, the fruit or vegetable is passed into a bath of one of our coatings, drained and dried. Spraying methods have been tried and are satisfactory. The thickness of the coating depends upon its surface tension in the liquid state so that successful application requires merely that sufficient liquid coating be applied. Any excess drips off.

Examination of the dried coating on a skin or peel discloses the lyocratic colloid particles dispersed as minute specks uniformly throughout the thickness of the film. Some of the particles are exposed on the surface of the film. When the skin or peel is immersed in water, the lyocratic colloid particles on the surface immediately commence to imbibe water and swell. As the surface of the film crumbles, embedded lyocratic colloid particles are exposed to water and very quickly, the entire film is loosened. There must be good contact with water, as by immersion, and a washing action, as by hands, is desirable.

This invention would be of little value if the water singly loosened the lyocratic colloid particles. Apparently this is not the case. The particles which are on the surface of the film are tightly embedded in the wax and upon dipping in water, the latter does not work its way between the particles and the wax but passes directly into the lyocratic colloid which swells and cracks the wax.

As mentioned above, water immersion or a washing action with water is necessary. Mere spraying, as is done by water vapor devices in fruit and vegetable stores, does not seem greatly to affect the coating.

Results of experiments on specific fruits and vegetables

The results of experiments with coatings of Formulae II and IV on typical fruits and vegetables will convey a clearer picture of the functioning of our coatings. Two vegetables, carrots and cucumbers, and two fruits, pears and oranges, were treated. The carrot has an uneven surface; the cucumber a smooth surface; the oranges an uneven surface with pores; and the pears a smooth surface with pores.

The coating on a carrot will dry within about twenty minutes of dipping. This drying time holds for all of our formulae. After the coating has thoroughly dried, immersion in water for a few seconds will permit its complete removal by lightly rubbing with the hands. Immersion in water for a few minutes, will permit removal by mere agitation of the carrot in the water, although wiping is still desirable.

Application of the coating to a cucumber will result in a dried coating within twenty minutes after dipping. After hardening, immersion in water for a few seconds will permit its complete removal by lightly rubbing with the hands. Immersion in water for a few minutes will permit removal by mere agitation of the cucumber in the water, although wiping is desirable.

Application of our coatings to oranges and pears yields similar results. The coatings are easily and quickly removed by the application of water. On the other hand, the coatings have great protective power and greatly prolong the salable life of any fruit and vegetable.

Other lyocratic colloids which may be used

Specific illustrations have been given of two reversible lyocratic colloids: bentonite, gelatin and Irish moss. There are many other materials which possess the requisite expanding power and reversibility—gum tragacanth, gum karaya, gum arabic, sago, and a mixture of starch, glycerin and water as prepared in common practice. This list does not complete those materials which possess these qualities.

The chart following shows the range in grams and per cent of the lyocratic colloids which may be used in Formula II or Formula IV, assuming the specific gravity of the shellac solution to be that of water. The minimum in each range is that practical limit where less than the amount of the lyocratic colloid specified produces a coating which after hardening on the skin or peel is not loosened by immersion in water. The maximum in each range is that limit where more lyocratic colloid affects the stability of the coating or reduces the luster or hardness of the dried coating.

|  | Minimum | Maximum |
| --- | --- | --- |
| Bentonite | 0.3 gm. (.083%) | 2.6 gm. (.73%) |
| Gelatin, as agar-agar | 0.3 gm. (.083%) | 1.3 gm. (.37%) |
| Irish moss | 0.2 gm. (.056%) | 0.65 gm. (.18%) |
| Gums, including karaya, tragacanth and arabic. | 0.3 gm. (.083%) (approx.) | 1.3 gm. (.37%) (approx.) |

The conclusion should not be drawn from the above table that 1.3 gm. of gelatin is the equivalent of 2.6 gm. of bentonite. While it is true that the water adsorptive properties of the gelatin is about twice that of the bentonite, there are other qualities which apparently affect the coatings.

The scope of this invention is not limited to the named lyocratic colloids, for it is believed that the critical characteristics which an ingredient must have in order to perform within the scope of this invention have been disclosed in this specification and that any material, now known, or hereafter discovered, which possesses these characteristics will fall within the terms of this invention when used in a water wax suspension for coating purposes.

The word "lyocratic" is a new word. By its etymology, strictly it means "loose lattice"; in use it means "forming a loose lattice, as with water." The word "reversible" means "capable of expanding in the presence of water and when the water is removed, as by evaporation, contracting."

The bentonite used is the Wyoming type which is capable of adsorbing up to six to eight times its actual weight of water. The usefulness of the lyocratic colloid will vary directly with its water adsorptive property.

As a wax, we include both those substances which are classified as waxes because of their chemical resemblance to beeswax as well as all those wax-like substances whose resemblance to beeswax lies only in their physical properties.

Having thus described the invention, what we claim as new and desire to secure by Letters Patent of the United States, is:

1. A coating of the following composition:

| | | |
| --- | --- | --- |
| Carnauba wax | gm | 30. |
| Oleic acid | gm | 3.3 |
| Caustic soda | gm | 0.5 |
| Triethanolamine | gm | 2.7 |
| Shellac solution | cc | 60. |
| Water | gm | 260. |
| Gelatin | gm | 0.30 to 1.3 | where the shellac solution consists of

| | | |
| --- | --- | --- |
| Refined wax free shellac | lbs | 1.5 |
| Borax | lb | 0.38 |
| Water | gal | 1.0 |

2. A coating of the following composition:

| | | |
|---|---|---|
| Carnauba wax | gm | 30. |
| Oleic acid | gm | 3.3 |
| Caustic soda | gm | 0.5 |
| Triethanolamine | gm | 2.7 |
| Shellac solution | cc | 60. |
| Water | gm | 260. |
| Irish moss bleached | gm | 0.2 to 0.65 |

3. A coating composition for providing a self-lustering water removable coating on natural food products comprising a hard wax, a fatty acid of high molecular weight, triethanolamine, water and a reversible lyocratic colloid.

4. A coating composition for providing a self-lustering water removable coating on natural food products comprising a hard wax, a fatty acid of high molecular weight, triethanolamine, water, and a reversible lyocratic colloid, wherein the wax, lyocratic colloid and water are in about the proportions respectively of 10 parts to .1 part to 100 parts.

5. A coating composition for providing a self-lustering water removable coating on natural food products comprising an emulsion of a hard wax in water and a reversible lyocratic colloid having therein as an emulsifying agent the reaction product of a fatty acid of high molecular weight and an alkaline reacting dispersing agent, holding the dispersed phase in such small particle size that it will dry bright or with substantial lustre when merely applied to a surface and exposed to the atmosphere.

6. A self-lustering wax suspension comprising a colloidal suspension of a hard wax in water, as an emulsifying agent the reaction product of a fatty acid of high molecular weight and an alkaline reacting substance, and a reversible lyocratic colloid in an amount insufficient to precipitate the dispersed phase, wherein said emulsifying agent holds the dispersed phase in such small particle size that the composition will dry with substantial lustre when merely applied to a surface and exposed to the atmosphere, and wherein the composition is free from organic solvents.

7. A self-lustering wax suspension comprising a colloidal suspension in water of a hard wax including carnauba wax, as an emulsifying agent the reaction product of a fatty acid of high molecular weight and an alkaline reacting substance, and a reversible lyocratic cololid in an amount from about .1 to 1% by weight of the water, wherein the emulsifying agent holds the dispersed phase in such small particle size that the composition will dry with substantial lustre when merely applied to a surface and exposed to the atmosphere, and wherein the composition is free from organic solvents.

8. A composition as set forth in claim 6 wherein the lyocratic colloid is bentonite.

9. A composition as set forth in claim 6 wherein the lyocratic colloid is gelatin.

10. A composition as set forth in claim 6 wherein the lyocratic coloid is Irish moss.

JOHN VERNON STEINLE.
ANTON E. BUDNER.